(12) United States Patent
Shah

(10) Patent No.: US 11,882,192 B2
(45) Date of Patent: Jan. 23, 2024

(54) INTELLIGENT NEAR-FIELD ADVERTISEMENT WITH OPTIMIZATION

(71) Applicant: Microsoft Technology Licensing, LLC, Redmond, WA (US)

(72) Inventor: Shrey Shah, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/824,574

(22) Filed: May 25, 2022

(65) Prior Publication Data

US 2023/0412692 A1 Dec. 21, 2023

(51) Int. Cl.
*H04L 67/147* (2022.01)
*G06N 5/025* (2023.01)

(52) U.S. Cl.
CPC .......... *H04L 67/147* (2013.01); *G06N 5/025* (2013.01)

(58) Field of Classification Search
CPC .............................. H04L 67/147; G05N 5/025
See application file for complete search history.

(56) References Cited

U.S. PATENT DOCUMENTS

| | | | |
|---|---|---|---|
| 8,392,526 B2 | 3/2013 | Mallet et al. | |
| 8,571,600 B2 | 10/2013 | Sarkar et al. | |
| 9,042,817 B2 | 5/2015 | Tse et al. | |
| 9,173,165 B2 | 10/2015 | Stark et al. | |
| 9,185,603 B1* | 11/2015 | McCarthy | H04W 28/20 |
| 10,237,763 B1* | 3/2019 | Wise | H04W 24/04 |
| 10,448,454 B1* | 10/2019 | Tao | H04L 67/51 |
| 10,700,774 B2 | 6/2020 | Panther et al. | |
| 10,915,853 B2* | 2/2021 | Berk | G06N 20/00 |
| 11,575,759 B1* | 2/2023 | Robinson | H04L 67/306 |
| 2002/0164963 A1* | 11/2002 | Tehrani | H04B 7/0814 |
| | | | 455/272 |
| 2013/0065520 A1 | 3/2013 | Skutnick | |
| 2014/0068059 A1* | 3/2014 | Cole | H04L 41/12 |
| | | | 709/224 |
| 2014/0114765 A1 | 4/2014 | Lee | |
| 2014/0222700 A1* | 8/2014 | Galligan | G06Q 30/02 |
| | | | 705/319 |
| 2015/0126118 A1* | 5/2015 | Lin | H04W 76/14 |
| | | | 455/41.2 |

(Continued)

OTHER PUBLICATIONS

Ammar et al., "Deep Learning Achievements and Opportunities in Domain of Electronic Warfare Applications", Tenth International Conference on Intelligent Computing and Information Systems, Dec. 5, 2021, IEEE Publishing.*

(Continued)

*Primary Examiner* — Todd L Barker

(57) ABSTRACT

In non-limiting examples of the present disclosure, systems, methods, and devices for intelligent advertising with optimization. A first device may determine a scenario for completion with a second device. The first device may receive device signals associated with the scenario. The first device may analyze the device signals based on the scenario with a rules engine. The first device may determine whether the second device is ready to participate in the scenario. In response to determining that the second device is ready to participate in the scenario, the first device may transmit an advertisement or listen for an advertisement from the second device.

20 Claims, 9 Drawing Sheets

(56) References Cited

U.S. PATENT DOCUMENTS

| | | | |
|---|---|---|---|
| 2016/0149969 A1 | 5/2016 | Farmer et al. | |
| 2017/0178030 A1* | 6/2017 | Pal | G06F 30/20 |
| 2018/0083828 A1* | 3/2018 | Cartaya | H04L 41/122 |
| 2018/0189647 A1 | 7/2018 | Calvo et al. | |
| 2019/0028141 A1* | 1/2019 | Padden | H04W 72/0453 |
| 2019/0164126 A1* | 5/2019 | Chopra | G06Q 10/08355 |
| 2020/0112856 A1* | 4/2020 | Asher | G06N 3/04 |
| 2020/0412664 A1* | 12/2020 | Ramachandra | H04L 41/0668 |
| 2020/0412810 A1* | 12/2020 | Knight | H04L 69/18 |
| 2021/0112480 A1* | 4/2021 | Pillay-Esnault | H04W 64/006 |
| 2021/0211509 A1* | 7/2021 | Ly | H04W 4/70 |
| 2021/0311893 A1* | 10/2021 | Pohl | H04B 7/26 |

OTHER PUBLICATIONS

Han et al., "Securiy-Enhanced Push Button Configuration for Home Smart Control", Jun. 2017.*

Mohanasundar et al., "Student Attendance Manger U sing Beacons and Deep Learning", First International Conference on Advances in Physical Sicences and Materials, Aug. 13, 2020.*

Kikuchi et al., "Orchestration of IoT Device and Business Workflow Engine on Cloud", 2018 3rd Cloudifcation of the Internet of Things (CIoT), Jul. 2, 2018, IEEE Publishing.*

Fremery, Rosed., "How to Use Link to Windows on your Galaxy Smartphone", Retrieved From: https://insights.samsung.com/2022/02/22/how-to-use-link-to-windows-on-your-galaxy smartphone-3/, Feb. 22, 2022, 7 Pages.

"International Search Report and Written Opinion Issued in PCT Application No. PCT/US2023/012970", dated Jun. 1, 2023, 11 Pages.

* cited by examiner

INTELLIGENT NEAR-FIELD ADVERTISEMENT WITH OPTIMIZATION

BACKGROUND

Computing devices need to communicate with one another for various reasons. In many cases, user initiation of the communication is used. However, there are many situations in which a user would prefer that one device inform another of an opportunity to start or execute a scenario without user input. The computing device communicating to other devices may advertise the notification (e.g., broadcast message, beacon, etc.), and another device may be listening and respond. However, the acts of advertising and listening continuously are power intensive and therefore use large amounts of battery life for the computing devices involved.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods, and devices for intelligent advertisement with optimization. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method for intelligent advertisement. The computer-implemented method includes determining a scenario for completion between a transmitting device and a receiving device. The transmitting device receives device signals associated with the scenario from the transmitting device. The transmitting device analyzes, with a rules engine, the device signals based on the scenario to determine whether the receiving device is ready to participate in the scenario. The rules engine may include a combination of static rules and machine learning models. In response to determining that the receiving device is ready to participate in the scenario, the transmitting device transmits an advertisement to advance the scenario. Other embodiments of this aspect include corresponding computer systems, apparatus, and computer programs recorded on one or more computer storage devices, each configured to perform the actions of the methods.

Implementations may include one or more of the following features. In some embodiments, the device signals may include device state signals, connectivity signals, sensor signals, operating system signals, application signals, or a combination thereof. In some embodiments, the transmitting device may select a transport based on the scenario and the device signals and transmit the advertisement on the selected transport. In some embodiments, the transmitting device may receive the static rules from a first remote hosting system and the general machine learning models from a second remote hosting system. The general machine learning models may include models trained using general data from a plurality of devices attempting to complete the scenario. The transmitting device may also access personal machine learning models that are trained using personal data from the transmitting device attempting to complete the scenario. The transmitting device may merge the static rules, the general machine learning models, and the personal machine learning models into the rules engine for analyzing the device signals based on the scenario. In some embodiments, the transmitting device may filter the device signals based on the scenario and the rules engine analyzes the filtered device signals. In some embodiments, the transmitting device may track a state of the scenario and provide the state to the rules engine such that the rules engine uses the state of the scenario in analyzing the device signals. In some embodiments, the transmitting device may track a state of the scenario and use the state of the scenario to train personal machine learning models for use in the rules engine. In some embodiments, the transmitting device may receive feedback from the receiving device on the execution of the scenario and use the feedback to train the personal machine learning models. Implementations of the described techniques may include hardware, a method or process, or computer software on a computer-accessible medium.

Another general aspect includes a computer-implemented method for intelligent listening. The computer-implemented method includes determining a scenario for completion between a transmitting device and a receiving device. The receiving device may receive device signals associated with the scenario from the receiving device. The receiving device may analyze, with a rules engine, the device signals based on the scenario to determine whether the transmitting device is ready to participate in the scenario. The rules engine may include a combination of static rules and machine learning models. In response to determining that the transmitting device is ready to participate in the scenario, the receiving device may listen for an advertisement to advance the scenario. Other embodiments of this aspect include corresponding computer systems, apparatus, and computer programs recorded on one or more computer storage devices, each configured to perform the actions of the methods.

Implementations may include one or more of the following features. The receiving device may receive the advertisement and execute an action to advance the scenario in response to receiving the advertisement. The receiving device may track a state of the scenario and transmit feedback based on the state of the scenario and personal data associated with the scenario to the transmitting device. The receiving device may transmit feedback based on the state of the scenario and general data associated with the scenario to a remote training system. Implementations of the described techniques may include hardware, a method or process, or computer software on a computer-accessible medium.

BRIEF DESCRIPTION OF THE DRAWINGS

Non-limiting and non-exhaustive examples are described with reference to the following figures.

DETAILED DESCRIPTION

Figure 1:
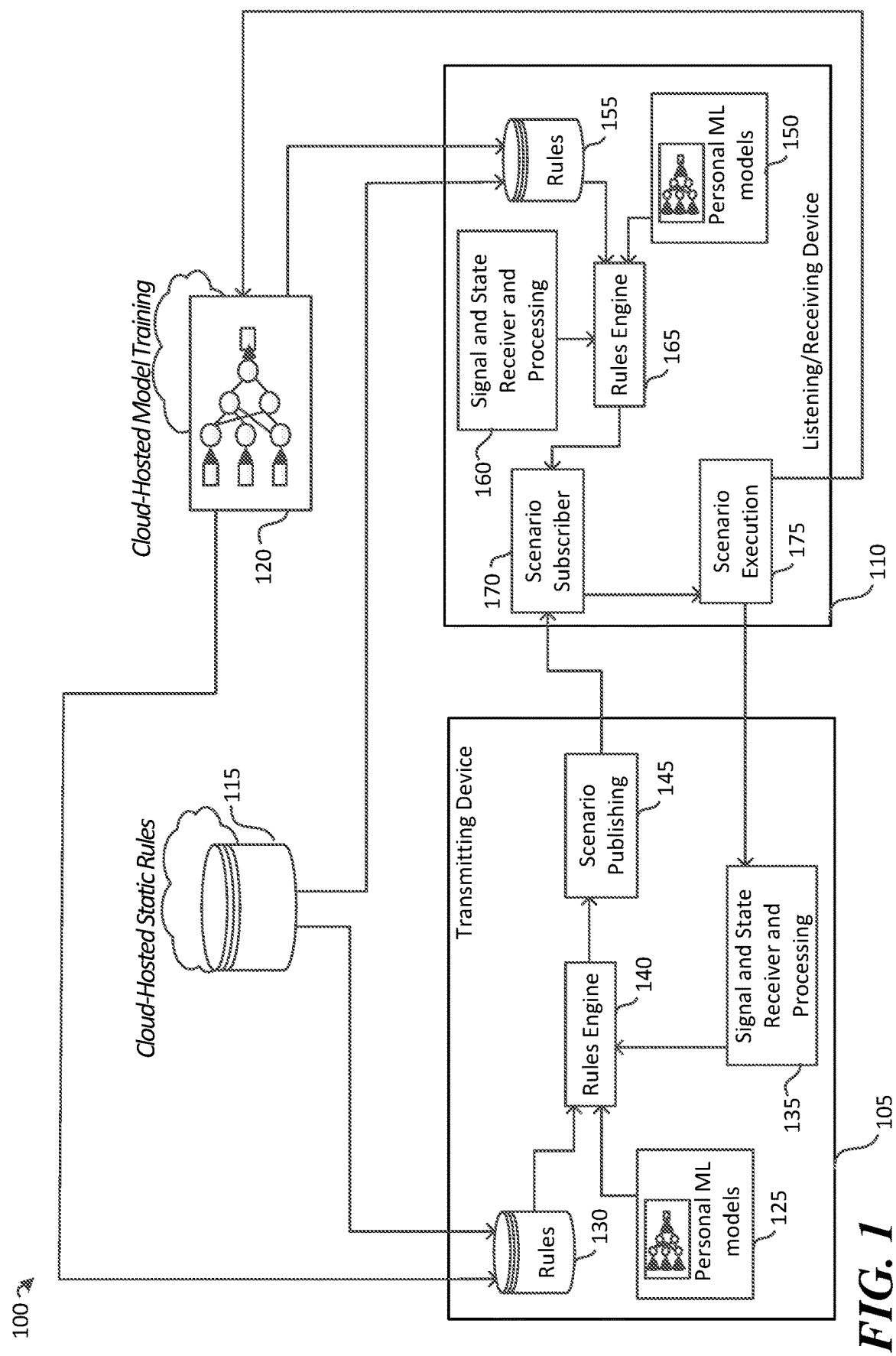
FIG. 1 is a schematic diagram illustrating an example computing environment for intelligent advertisement with optimization.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for intelligent near-field advertisement with optimization. As used herein, "advertisement" describes signal transmission from a first device for receipt by at least one other device in which the signal publishes a state so that other devices listening for that state may react. In some embodiments, the advertisement may be a broadcast message or any type of message transmitted without a specific receiver addressed. The advertisement may be transmitted on one or more transports. In some embodiments the advertisement may be completed using a near-field transport technology (e.g., BLUETOOTH®, near-field communication (NFC) or other near-field transports). However, any transport technology that supports the concept of an advertisement may be used.

As used herein, "transport" describes a protocol or carrier for communication between devices. Transports may include, for example, BLUETOOTH®, near-field communication (NFC) or other near-field transports, Wi-Fi®, Wi-Fi® Direct, ultra-wideband (UWB), an infrastructure network such as a cellular network, a satellite network, or a cable network, cloud/push, and the like.

As used herein, "scenario" describes a multi-device communication and execution of an action. For example, a scenario could take the form of an enticement to "setup" (e.g., device X is ready to be setup), call to action (e.g., device X is reporting some state, take an action; phone is in vehicle and ready to pair, pair with the phone), or other complex multi-device use case (e.g., phone is nearby, use it to input your signature).

The applicability of the transport technology varies based on the scenario but also varies based on factors like user-specific usage patterns, environmental conditions affecting signal strength, external conditions involving the presence of other device, and the like. Accordingly, determining which transport to use in any scenario may create ambiguity. Further, devices that need to advertise require battery intensive operation that makes advertising restrictive for mobile devices. Similarly, devices that need to listen require battery intensive operation that makes listening restrictive. The resulting ambiguity about when to advertise, when to listen, and which technology to transmit the advertisement on make the scenarios highly sensitive to factors that are dynamic.

The described solution optimizes advertising based on the dynamic factors such that if there is not a high chance that a listening device will hear the advertisement, the advertisement is not sent. Additionally, an optional solution can be applied to the listening device to optimize listening based on the dynamic factors such that if there is not a high chance that an advertising device will be transmitting, the device does not listen for the advertisement.

According to examples, a scenario is selected by a transmitting device. For example, the transmitting device may be a mobile phone. The scenario may be that the mobile phone should pair automatically with capable radios in any vehicle that it travels in regularly. To determine whether to advertise that the mobile phone is ready to pair, a number of dynamic factors should be considered. At least some of those dynamic factors may be scenario specific and others may be general to most or all scenarios. The dynamic factors may include information about the environment, device usage, device state, connectivity strength, hardware options, software options, and the like. The transmitting device may receive device signals from a number of sources that provide information about the dynamic factors. For example, sensors may provide information relevant to the environment and status of the device including, for this example, whether the device is traveling in a vehicle. The transmitting device may use static rules that operate as initial thresholds for further analysis of the signals. For example, threshold proximity values, signal strength, and the like may be included in the static rules. The transmitting device may further use general dynamic rules that include machine learning models generated and trained based on general (non-personal) information from many devices. General information may include, for example, whether the device is connected to a Wi-Fi® access point and whether that connection is public or private. Further, the transmitting device may use personal dynamic rules that include machine learning models generated and trained based on personal information from the transmitting device. Personal information may include, for example, the name of the access point. The static rules, general dynamic rules, and personal dynamic rules may be merged into a rules engine. The rules engine may analyze the signals based on the scenario using the static rules, general dynamic rules, and personal dynamic rules associated with the scenario. Based on the analysis, the transmitting device may select a transport to use for the advertisement. The analysis may indicate that a receiving device is ready to participate in the scenario. For example, in this example of a phone pairing with a vehicle, the rules engine may analyze the signals and determine that the transmitting device is in a vehicle that the user travels in sufficiently often that is not already paired with the transmitting device. In response to the determination that a receiving device (e.g., the vehicle's onboard stereo system) may be ready to participate in the scenario, the transmitting device may transmit an advertisement. For example, the transmitting device may transmit a Bluetooth® signal indicating it is ready to pair. By analyzing relevant signals using trained models to determine whether a receiving device may be ready to participate in the scenario, the transmitting device optimizes the chances of the receiving device receiving the advertisement. Further, the battery usage of the transmitting device is minimized Additionally, the user need not initiate the transmission. By automatically initiating the transmission, the user is not required to know about the feature or know how to invoke the communication, making the entire experience broader and easier for the user.

According to other examples, a receiving device may intelligently listen and optimize resources. For example, a scenario is selected by a receiving device. For example, the receiving device may be an onboard stereo in a vehicle. The scenario may be that the stereo should pair automatically with any mobile devices that travel in the vehicle regularly. To determine whether to listen for mobile devices, a number of dynamic factors should be considered. At least some of those dynamic factors may be scenario specific and others may be general to most or all scenarios. The dynamic factors may include information about the environment, device usage, device state, connectivity strength, hardware options, software options, and the like. The receiving device may receive device signals from a number of sources that provide information about the dynamic factors. For example, sensors may provide information relevant to the environment and status of the device including, for this example, whether other mobile devices are nearby. The receiving device may use static rules that operate as initial thresholds for further analysis of the signals. For example, threshold proximity values, signal strength, and the like may be included in the static rules. The receiving device may further use general dynamic rules that include machine learning models generated and trained based on general (non-personal) information from many devices. General information may include, for example, whether the device is connected to a Wi-Fi® access point and whether that connection is public or private. Further, the receiving device may use personal dynamic rules that include machine learning models generated and trained based on personal information from the receiving device. Personal information may include, for example, the name of the access point. The static rules, general dynamic rules, and personal dynamic rules may be merged into a rules engine. The rules engine may analyze the signals based on the scenario using the static rules, general dynamic rules, and personal dynamic rules associated with the scenario. The analysis may indicate that a transmitting device may be ready to participate in the scenario. For example, in this example of a phone pairing with a radio in a vehicle, the rules engine may analyze the signals and determine that the transmitting device is in a vehicle that the user travels in sufficiently often that is not already paired with the receiving device. In response to the determination that a transmitting device (e.g., a mobile phone) may be ready to participate in the scenario, the receiving device may listen for an advertisement. For example, the transmitting device may transmit a Bluetooth® signal indicating it is ready to pair. The receiving device may receive the transmission and initiate pairing with the mobile device. By analyzing relevant signals using trained models to determine whether a transmitting device may be ready to participate in the scenario, the receiving device optimizes the chances that the transmitting device is sending an advertisement relevant to the receiving device. Further, the battery usage of the receiving device is minimized Additionally, the user need not initiate or complete the scenario. By automatically listening for the transmission, the user is not required to know about the feature or know how to invoke the communication, making the entire experience broader and easier for the user.

The systems, methods, and devices described herein provide technical advantages for optimizing near-field advertisements and listening for such advertisements. Battery life on mobile devices is limited, and the functions of transmitting advertisements and listening for those advertisements are power intensive, so they deplete battery life quickly. Optimization of transmission and listening for the advertisements helps limit unnecessary depletion of the battery. Existing systems do not optimize or intelligently solve the problem. One solution is periodic transmission and listening, but that still requires a great deal of unnecessary battery use. Further, with periodic transmission and reception, in many cases the transmitter is transmitting when no other device is listening, and the receiving device is listening when no other device is transmitting. Another solution is to restrict operation to a narrow range of user actions, so that transmission of the advertisement only occurs when specific user actions happen. This unnecessarily limits the user experiences. The solution described herein provides an intelligent optimization that expands user experiences and minimizes unnecessary battery consumption.

FIG. 1 is a schematic diagram of a system 100 for intelligent advertising and optimization. The system may include a transmitting device 105, receiving device 110, cloud-hosted static rules 115, and cloud-hosted model training 120.

Cloud-hosted static rules 115 may include static rules that serve as guardrails for the scenario-specific machine learning models used in the rules engine 140. The cloud-hosted static rules 115 may allow for definition of pre-filtering criteria or thresholds for the machine learning model execution. As a cloud-hosted system, the locally stored rules (e.g., in rules database 130 and 155) may be updated via a cloud service. For example, the static rules may be transmitted to devices such as transmitting device 105 and receiving device 110 when rules are modified, added, or deleted based on the device subscribing to the cloud service. Further, the static rules may be scenario specific such that a device may subscribe to only relevant rule updates based on scenario, for example.

Cloud-hosted model training 120 may include dynamic rules including machine learning models based on general information useful for all devices. The general machine learning models may be scenario specific. The general machine learning models trained and provided by cloud-hosted model training 120 may include models that are general and not personal so that, for example, the information used to train the models excludes location, specific Wi-Fi® names, and other information personal to a device or user. This general model training and tuning enables a privacy conscious approach as well as efficiency by modeling and training as much general information as possible on a powerful cloud-hosted server. The general machine learning models provided by cloud-hosted model training 120 may be tuned by information continuously provided by devices based on scenario state and execution. The general machine learning models may also be used as a foundation for the personal machine learning models 125 in some embodiments. The general machine learning models may be scenario specific, in some embodiments. As a cloud-hosted system, the locally stored general machine learning models (e.g., in rules database 130 and 155) may be updated via a cloud service. For example, the models may be transmitted to devices such as transmitting device 105 and receiving device 110 when models are modified, added, or deleted based on the device subscribing to the cloud service. In some embodiments, the models may be updated periodically to avoid constant updates as the models may be continuously tuned. In some embodiments, the models may be scenario specific such that a device may subscribe to models for relevant scenarios, for example.

Transmitting device 105 may be a computing device, such as a mobile device, which may have a need to inform another device of an opportunity to start or execute a scenario. Transmitting device 105 may be, for example, computing device 600, computing device 700, computing device 800, mobile computing device 908, and/or tablet computing device 906. Transmitting device 105 may include personal machine learning models 125, rules database 130, signal and state receiver and processing 135, rules engine 140, and scenario publishing 145. Transmitting device 105 may include more components not shown for ease of description. Transmitting device 105 may include fewer components while still providing the same functionality described herein as the components may be combined or otherwise consolidated.

Personal machine learning models 125 may be models generated and trained using personal information of the transmitting device 105 from performing various scenarios. In some embodiments, the general machine learning models provided by cloud-hosted model training 120 may provide a foundation for the generation of the personal machine learning models 125. For example, the personal machine learning models 125 may be personalized adaptations of the general models that also includes personal embeddings (e.g., location information, Wi-Fi® access point names, Internet Protocol (IP) addresses, and the like). Personal information may include any information about the transmitting device 105 that should not leave transmitting device 105 for privacy reasons, for example. In some embodiments, privacy settings may establish which data is considered personal or general. For example, the name of the Wi-Fi® access points that transmitting device 105 connects to may be deemed personal information that may not be generalized and should instead be kept private on transmitting device 105. Other examples of personal information may include location information, IP addresses, Wi-Fi® names, names of other connected devices, access point names, and the like. The personal machine learning models 125 may be scenario specific models in some embodiments. The personal machine learning models 125 may be trained from data gathered from the transmitting device 105 during scenario execution, the receiving device 110 during scenario execution, the scenario state information from transmitting device 105 and/or receiving device 110, and the like, and the personal machine learning models 125 may be trained and tuned locally on the transmitting device 105 to maintain privacy and efficiency. The personal machine learning models may be used by the rules engine 140 to analyze signals from signal and state receiver and processing 135 as described in more detail below and with respect to FIGS. 2 and 3.

Rules database 130 may include the static rules obtained from cloud-hosted static rules 115 and from cloud-hosted model training 120 as described above. Rules database 130 may be updated, for example, periodically, as needed, by subscription, and the like. As shown, personal machine learning models 125 are provided directly to rules engine 140. In some embodiments, personal machine learning models 125 may also be stored in rules database 130. In some embodiments, rules database 130 may include merged rules including the static rules, general dynamic models, and personal dynamic models that are used by the rules engine 140 to analyze the signals for a given scenario. In some embodiments, the merged rules include sets of rules and models that are scenario specific and stored in the rules database 130 for a given scenario.

Rules engine 140 may, in some embodiments, process the static rules and general dynamic models from rules database 130 as well as the personal dynamic models from personal machine learning models 125 to generate merged rules for analyzing the signals for a scenario. Rules engine 140 may use the rules and models to analyze the signals from signal and state receiver and processing 135 to determine whether another device is ready to participate in the selected scenario. When rules engine 140 determines another device may be ready to participate in the selected scenario, an indication is provided to scenario publishing 145. Rules engine 140 may further select the transport for transmitting the advertisement based on the analysis. For example, a transport having a stronger signal may be used over one having a weaker signal based on the analysis and available options for the advertisement transport in the given scenario.

Signal and state receiver and processing 135 may include components that receive the signals, filter the signals, track the state of the scenarios from both the transmitting device 105 and receiving device 110, and the like. Signal and state receiver and processing 135 is described in more detail with respect to FIG. 2. The signals, once received and optionally filtered, may be provided to rules engine 140 for analysis. In some embodiments, the state tracking component of the signal and state receiver and processing 135 may select the scenario for execution.

Scenario publishing 145 may include hardware and/or software components capable of transmitting an advertisement intended to advance the selected scenario. Scenario publishing 145 may transmit the advertisement on the selected transport once rules engine 140 provides the indication that the receiving device 110 may be ready to listen and receive the advertisement.

Receiving device 110 may be a computing device, such as a mobile device, which may have an interest in engaging in a scenario with transmitting device 105. Receiving device may be, for example, computing device 600, computing device 700, computing device 800, mobile computing device 908, and/or tablet computing device 906. Receiving device 110 may be much simpler than depicted in FIG. 1. For example, receiving device need not intelligently listen for advertisements. Rather, existing devices that listen for advertisements on, for example, Bluetooth® transport may still receive the advertisement transmitted by transmitting device 105. In such embodiments, receiving device 110 may include a reception component that receives the signal and executes some action in response to receiving the advertisement. In some embodiments, receiving device 110 may also include a component capable of providing feedback to the cloud-hosted model training 120 for tuning the general dynamic models. The receiving device 110 may further include a component capable of providing feedback to the transmitting device 105 that can be used to tune the personal machine learning models 125.

In the embodiment shown in FIG. 1, receiving device 110 includes further components for intelligent listening for advertisements from transmitting device 105. Receiving device 110 may include personal machine learning models 150, rules database 155, signal and state receiver and processing 160, rules engine 165, scenario subscriber 170, and scenario execution 175. Receiving device 110 may include more components not shown for ease of description. Receiving device 110 may include fewer components while still providing the same functionality described herein as the components may be combined or otherwise consolidated.

Personal machine learning models 150 may be models generated and trained using personal information of the receiving device 110 from performing various scenarios. Personal machine learning models 150 may be substantially the same as the personal machine learning models 125 in transmitting device 105. In some embodiments, both the transmitting device 105 and receiving device 110 may have complementary components such that each can intelligently transmit and intelligently listen. In such embodiments, corresponding components may be used for both intelligently transmitting and intelligently listening.

Rules database 155 may include the static rules obtained from cloud-hosted static rules 115 and from cloud-hosted model training 120 as described above. Rules database 155 may be substantially the same as rules database 130 described with respect to transmitting device 105.

Rules engine 165 may, in some embodiments, process the static rules and general dynamic models from rules database 155 as well as the personal dynamic models from personal machine learning models 150 to generate merged rules for analyzing the signals for a scenario. Rules engine 165 may be substantially the same as rules engine 140 as described with respect to transmitting device 105. Once rules engine 165 determines that a transmitting device 105 may be transmitting an advertisement to advance the scenario, rules engine 165 provides an indication to scenario subscriber 170.

Signal and state receiver and processing 160 may include components that receive the signals, filter the signals, track the state of the scenarios from both the transmitting device 105 and receiving device 110, and the like. Signal and state receiver and processing 160 is described in more detail with respect to FIG. 3. The signals, once received and optionally filtered, may be provided to rules engine 165 for analysis. In some embodiments, the state tracking component of the signal and state receiver and processing 160 may select the scenario for execution.

Scenario subscriber 170 may include hardware and/or software components capable of listening for an advertisement. Scenario subscriber 170 may listen for an advertisement once rules engine 165 provides the indication that the transmitting device 105 may be transmitting an advertisement.

Scenario execution 175 may receive the signal from scenario subscriber 170 that the advertisement was received and execute an action to advance the scenario. For example, if the scenario is a setup scenario to, for example, pair the transmitting device 105 with the receiving device 110, and a pair request is received as the advertisement, scenario execution 175 may execute the next action needed to complete the pairing. Scenario execution 175 may provide feedback on the execution to signal and state receiver and processing 135 in transmitting device 105 that can be used to tune the personal machine learning models 125. Scenario execution 175 may provide feedback on the execution to cloud-hosted model training 120 that can be used to tune the general machine learning models.

The above-described components will be discussed in more detail with respect to FIGS. 2 and 3. The use and flow of data will be further illustrated and discussed in more detail with respect to FIGS. 2-5.

Figure 2:
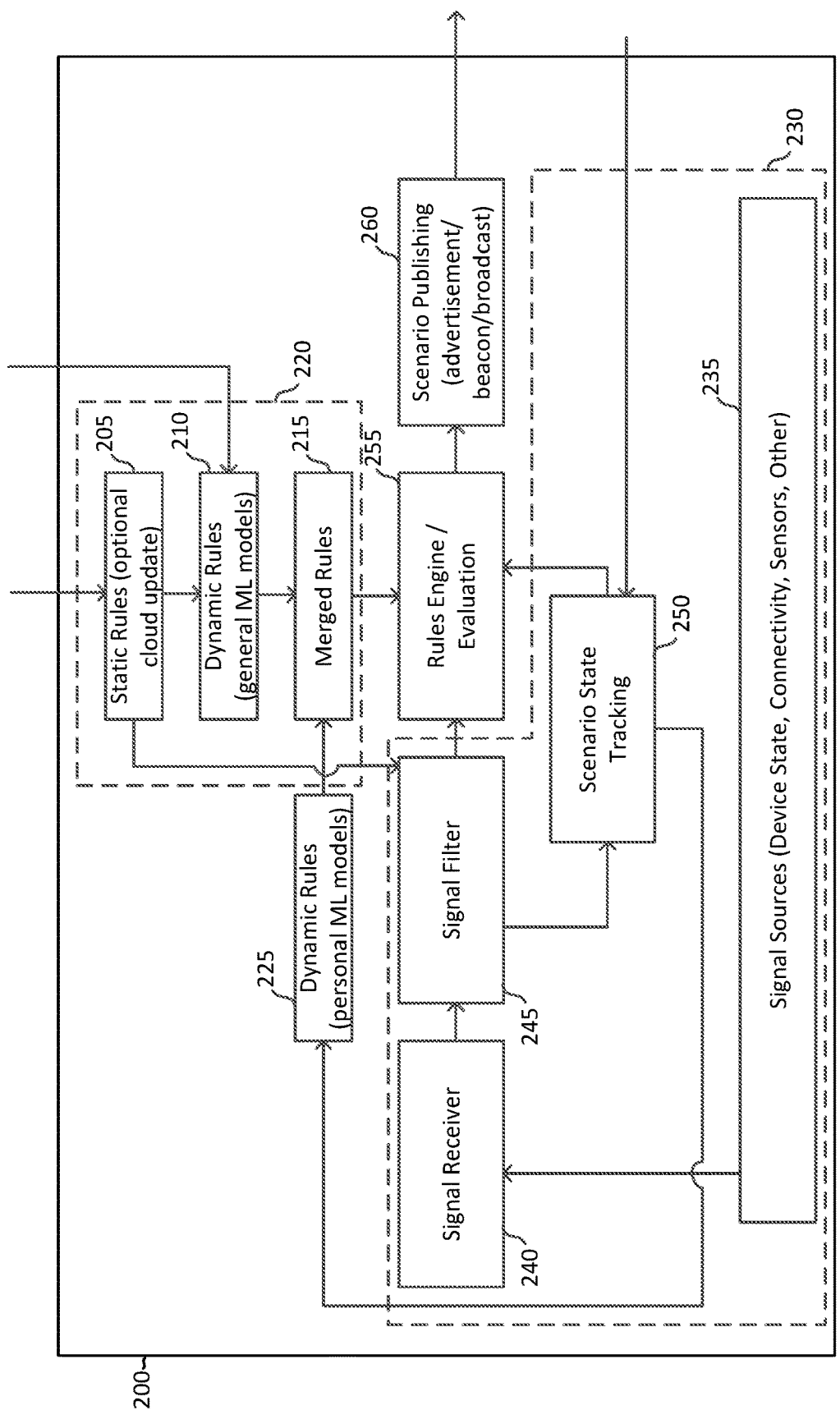
FIG. 2 is a schematic diagram illustrating an example transmission device.

FIG. 2 is a simplified block diagram illustrating an exemplary transmitting device 200. Transmitting device 200 may be, for example, transmitting device 105 as described with respect to FIG. 1. Transmitting device 200 may include rules database 220, dynamic personal rules 225, signal and state receiver and processing 230, rules engine 255, and scenario publishing 260.

Dynamic personal rules 225 may be substantially the same as personal machine learning models 125 as described with respect to FIG. 1. Dynamic personal rules 225 may include machine learning models generated and trained using personal information from the transmitting device 200, particularly with respect to attempting to perform various scenarios. Dynamic personal rules 225 may include components for training and tuning the machine learning models locally. In some embodiments, the general machine learning models provided by cloud-hosted model training 120 may provide a foundation for the generation of dynamic personal rules 225. For example, dynamic personal rules 225 may be personalized adaptations of the general models that also includes personal embeddings (e.g., location information, Wi-Fi® access point names, Internet Protocol (IP) addresses, and the like). Personal information may include any information about the transmitting device 200 that may be kept local for privacy reasons, for example. For example, the name of the Wi-Fi® access points that transmitting device 200 connects to may be deemed personal information that may not be generalized and should instead be kept locally only on transmitting device 200. Other examples of personal information may include location information, IP addresses, Wi-Fi® names, names of other connected devices, access point names, and the like. Dynamic personal rules 225 may be scenario specific models in some embodiments. Dynamic personal rules 225 may be trained from data gathered from the transmitting device 200 during scenario execution and from any receiving device that provides information regarding scenario execution, the scenario state information from transmitting device 200, and the like. Dynamic personal rules 225 may be trained and tuned locally on the transmitting device 200 to maintain privacy and efficiency.

Rules database 220 may include static rules 205, dynamic general rules 210, and merged rules 215. In some embodiments, dynamic personal rules 225 may also be included in rules database 220. Rules database 220 may be substantially the same as rules database 130 described with respect to FIG. 1. Static rules 205 may be obtained from any source. In some embodiments, the static rules 205 are provided by a cloud-hosted service (e.g., cloud-hosted static rules 115 as described with respect to FIG. 1). The static rules may provide thresholds or pre-filtering criteria for the dynamic models used by rules engine 255. Dynamic general rules 210 may be obtained from any source. In some embodiments, dynamic general rules 210 are provided by a cloud-hosted service (e.g., cloud-hosted model training 120 as described with respect to FIG. 1). Dynamic general rules 210 may include general machine learning models trained and provided by a remote server and may include models that are general and not personal so that, for example, the information used to train the models excludes location, specific Wi-Fi® names, and other information personal to a device or user. Rules database 220 may also include merged rules 215. The merged rules 215 may include static rules 205, dynamic general rules 210, and dynamic personal rules 225. Merged rules 215 may be scenario specific sets of rules that include merged rules from static rules 205, dynamic general rules 210, and dynamic personal rules 225 that are relevant to the respective scenarios. The rules may be merged by a component in the rules database 220 or, in some embodiments, by rules engine 255.

Rules engine 255 may, in some embodiments, process the static rules 205 and dynamic general rules 210 from rules database 220 as well as dynamic personal rules 225 to generate merged rules 215. Rules engine 255 may use the merged rules 215 to analyze the signals from signal and state receiver and processing 230 to determine whether another device is ready to participate in the selected scenario. For example, based on analyzing the relevant signals with the relevant merged rules 215 for a scenario, rules engine 255 may identify a transport for advertising as well as whether there is another device that is likely to be listening for the advertisement. As an example, in a scenario for pairing with a vehicle stereo, the rules engine 255 may analyze the signals to determine whether the transmitting device 200 is likely in a vehicle that meets the parameters (e.g., a vehicle that the user travels in regularly) and that has not already been paired with the transmitting device 200. As another example, the transmitting device 200 may have a scenario for transferring a call from the transmitting device 200 to another device. The rules engine 255 may evaluate the signals to determine whether the transmitting device 200 is likely near a device that the user would want the call transferred to (e.g., a home computer). In such examples, the rules engine 255 may determine a receiving device is likely to be available and listening for such an advertisement. When rules engine 255 determines another device may be ready to participate in the selected scenario, an indication is provided to scenario publishing 260. Rules engine 255 may further select the transport for transmitting the advertisement based on the analysis. For example, a transport having a stronger signal may be used instead of one having a weaker signal based on the analysis and available options for the advertisement transport in the given scenario.

Signal and state receiver and processing 230 may be substantially the same as signal and state receiver and processing 135 as described with respect to FIG. 1. Signal and state receiver and processing 230 may include signal sources 235, signal receiver 240, signal filter 245, and scenario state tracking 250. While signal sources 235 is shown as a portion of signal and state receiver and processing 230, the signal sources 235 may include many sources outside of the signal and state receiver and processing 230 component. For example, sensors including motion sensors may be a portion of the transmitting device 200 and may include hardware and software components that are included in transmitting device 200 with or without the signal and state receiver and processing 230 module. The signal sources 235 may include any sources of signals including components that provide information on the device state, connectivity, sensors, and the like. For example, transmitting device 200 may include transceivers that transmit and receive communication signals that may provide data related to signal strength, for example. As another example, signals related to whether the transmitting device 200 is in sleep mode or actively being used may be received from the operating system, for example. The signal receiver 240 receives the signals from the signal sources 235. In some embodiments, the signal receiver 240 may subscribe to certain signals, for example. The raw signals from the signal sources 235 may be noisy, in some embodiments. Signal filter 245 may be used to filter the signals received by the signal receiver 240. Static rules 205 may be used to filter the signals in signal filter 245. The filtered signals from signal filter 245 may be provided to the rules engine 255 for analysis and to scenario state tracking 250 for tracking the state of the scenario. In some embodiments, scenario state tracking 250 may use the scenario state to determine which scenarios to execute. Received signals may indicate that a scenario should be executed, in some embodiments. For example, a user interaction (direct—e.g., a button click to look for a device; indirect—e.g., the user launched an application) may be among the signals used to affect the applicability of a given scenario. These signals may be defined in the rules as enablement or disablement criteria for determining whether to execute a given scenario, for example. In cases where multiple scenarios may meet the execution criteria, static rules 205 may provide the guardrails to break the ties (e.g., via priority or calculated thresholds) or, in some embodiments, the system may indicate a need for user input to select a scenario. Scenario state tracking 250 may provide the state of the scenario to the rules engine 255 as an additional input for analysis of the filtered signals from signal filter 245. Scenario state tracking 350 may include state information on the scenario including which steps are completed in a given scenario, which steps have been attempted and failed, and so forth. Scenario state tracking 250 may also provide data on the state of the scenario to the dynamic personal rules 225 for tuning the models. Scenario state tracking 250 may also receive information about the scenario execution from the receiving device once the receiving device receives the advertisement and executes an action in furtherance of the scenario. The information from the receiving device may be provided to the dynamic personal rules 225 for additional tuning of the machine learning models.

Scenario publishing 260 may include hardware and/or software components capable of transmitting an advertisement intended to advance the selected scenario. Scenario publishing 260 may transmit the advertisement on the selected transport once rules engine 255 provides the indication that a receiving device may be ready to listen and receive the advertisement.

In use, transmitting device 200 is operating and signals are being generated by signal sources 235. The signal receiver 240 may receive the signals and signal filter 245 may filter the signals and provide them to scenario state tracking 250. Scenario state tracking 250 may select a scenario for execution. The selected scenario may be provided with the scenario status to the rules engine 255 by the scenario state tracking 250. The rules database 220 may be updated periodically, as needed, by subscription, by request, or on any other schedule. The static rules 205 may be obtained and used by signal filter 245 as well as rules engine 255. The dynamic general rules 210 may also be updated periodically, as needed, by subscription, by request, or on any other schedule. The dynamic personal rules 225 may be generated and trained periodically, as needed, by request, or on any other schedule. The merged rules 215 may be created for the scenario by, for example, the rules engine 255 or by a component in rules database 220. Rules engine 255, once it has the selected scenario, may access the relevant merged rules 215. The rules engine 255 may also receive the relevant signals from signal filter 245. In some embodiments, the signal filter 245 may also know which scenario is being executed and may provide only the relevant signals to rules engine 255. Rules engine may use the merged rules to analyze the filtered signals for the given scenario to determine whether a receiving device is likely to be listening for an advertisement to advance the scenario. The rules engine 255 may also select a transport for transmitting the advertisement based on the analysis. Rules engine 255 may provide an indication that a receiving device is likely ready to listen for the advertisement to scenario publishing 260 in response to making such determination. Rules engine 255 may also provide a preferred transport for transmitting the advertisement if one was selected in the analysis. Scenario publishing 260 may transmit the advertisement in response to receiving the indication.

Figure 3:
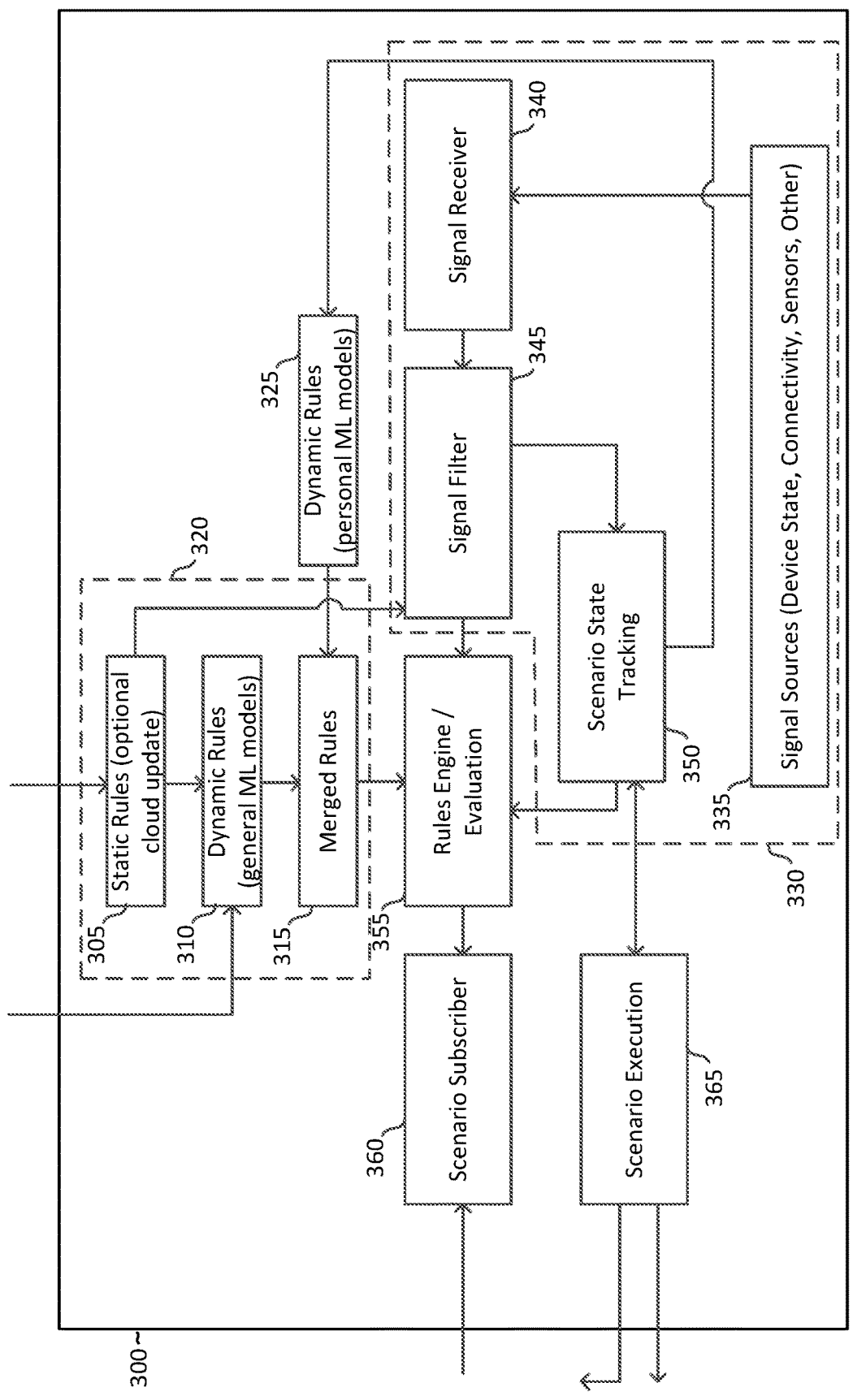
FIG. 3 is a schematic diagram illustrating an example receiving device.

FIG. 3 is a simplified block diagram of a receiving device 300. Receiving device 300 may be, for example, receiving device 110 as described with respect to FIG. 1. Receiving device 300 may include rules database 320, dynamic personal rules 325, signal and state receiver and processing 330, rules engine 355, scenario subscriber 360, and scenario execution 365.

Dynamic personal rules 325 may be substantially the same as personal machine learning models 150 as described with respect to FIG. 1 and dynamic personal rules 225 as described with respect to FIG. 2. The dynamic personal rules 325 may be used for both intelligent listening and intelligent receiving in a single device. Dynamic personal rules 325 may include machine learning models generated and trained using personal information from the receiving device 300, particularly with respect to attempting to perform various scenarios. Dynamic personal rules 325 may include components for training and tuning the machine learning models locally. In some embodiments, the general machine learning models provided by cloud-hosted model training 120 may provide a foundation for the generation of dynamic personal rules 325. For example, dynamic personal rules 325 may be personalized adaptations of the general models that also includes personal embeddings (e.g., location information, Wi-Fi® access point names, Internet Protocol (IP) addresses, and the like). Personal information may include any information about the receiving device 300 that may be kept local for privacy reasons. For example, the name of the Wi-Fi® access points that receiving device 300 connects to may be deemed personal information that may not be generalized and should instead be kept locally only on receiving device 300. Other examples of personal information may include location information, IP addresses, Wi-Fi® names, names of other connected devices, access point names, and the like. Dynamic personal rules 325 may be scenario specific models in some embodiments. Dynamic personal rules 325 may be trained from data gathered from the receiving device 300 during scenario execution and from any receiving device that provides information regarding scenario execution, the scenario state information from receiving device 300, and the like. Dynamic personal rules 325 may be trained and tuned locally on the receiving device 300 to maintain privacy and efficiency.

Rules database 320 may include static rules 305, dynamic general rules 310, and merged rules 315. In some embodiments, dynamic personal rules 325 may also be included in rules database 320 once the machine learning models are trained. Rules database 320 may be substantially the same as rules database 155 described with respect to FIG. 1 and rules database 220 as described with respect to FIG. 2. The rules database 320 may be used for both intelligent listening and intelligent receiving in a single device. Static rules 305 may be obtained from any source. In some embodiments, the static rules 305 are provided by a cloud-hosted service (e.g., cloud-hosted static rules 115 as described with respect to FIG. 1). The static rules 305 may provide thresholds or pre-filtering criteria for the dynamic models used by rules engine 355. Dynamic general rules 310 may be obtained from any source. In some embodiments, dynamic general rules 310 are provided by a cloud-hosted service (e.g., cloud-hosted model training 120 as described with respect to FIG. 1). Dynamic general rules 310 may include general machine learning models trained and provided by a remote server and may include models that are general and not personal so that, for example, the information used to train the models excludes location, specific Wi-Fi® names, and other information personal to a device or user. Rules database 320 may also include merged rules 315. The merged rules 315 may include static rules 305, dynamic general rules 310, and dynamic personal rules 325. Merged rules 315 may be scenario specific sets of rules that include merged rules from static rules 305, dynamic general rules 310, and dynamic personal rules 325 that are relevant to the respective scenarios. The rules may be merged by a component in the rules database 320 or, in some embodiments, by rules engine 355.

Rules engine 355 may be substantially the same as rules engine 165 described with respect to FIG. 1 and rules engine 255 as described with respect to FIG. 2. Rules engine 355 may be used for both intelligent listening and intelligent receiving in a single device. Rules engine 355 may, in some embodiments, process the static rules 305 and dynamic general rules 310 from rules database 320 as well as dynamic personal rules 325 to generate merged rules 315. Rules engine 355 may use the merged rules 315 to analyze the signals from signal and state receiver and processing 330 to determine whether another device is ready to participate in the selected scenario. For example, based on analyzing the relevant signals with the relevant merged rules 315 for a scenario, rules engine 355 may determine there is another device that is likely to be advertising. As an example, in a scenario for pairing with a vehicle stereo, the rules engine 355 may analyze the signals to determine whether a transmitting device is likely in a vehicle that meets the parameters (e.g., a vehicle that the user travels in regularly) and that has not already been paired with the receiving device 300. As another example, the receiving device 300 may have a scenario for transferring a call from another device to the receiving device 300. The rules engine 355 may evaluate the signals to determine whether a transmitting device is likely nearby that the user would want a call transferred from. In such examples, the rules engine 355 may determine a transmitting device is likely to be advertising. When rules engine 355 determines another device may be ready to participate in the selected scenario, an indication is provided to scenario subscriber 360.

Signal and state receiver and processing 330 may be substantially the same as signal and state receiver and processing 160 as described with respect to FIG. 1 and signal and state receiver and processing 230 as described with respect to FIG. 2. Signal and state receiver and processing 330 may be used for both intelligent listening and intelligent receiving in a single device Signal and state receiver and processing 330 may include signal sources 335, signal receiver 340, signal filter 345, and scenario state tracking 350. While signal sources 335 is shown as a portion of signal and state receiver and processing 330, the signal sources 335 may include many sources outside of the signal and state receiver and processing 330 component. For example, sensors including motion sensors may be a portion of the receiving device 300 and may include hardware and software components that are included in receiving device 300 with or without the signal and state receiver and processing 330 module. The signal sources 335 may include any sources of signals including components that provide information on the device state, connectivity, sensors, and the like. For example, receiving device 300 may include transceivers that transmit and receive communication signals that may provide data related to signal strength, for example. As another example, signals related to whether the receiving device 300 is in sleep mode or actively being used may be received from the operating system, for example. The signal receiver 340 receives the signals from the signal sources 335. In some embodiments, the signal receiver 340 may subscribe to certain signals, for example. The raw signals from the signal sources 335 may be noisy, in some embodiments. Signal filter 345 may be used to filter the signals received by the signal receiver 340. Static rules 305 may be used to filter the signals in signal filter 345. The filtered signals from signal filter 345 may be provided to the rules engine 355 for analysis and to scenario state tracking 350 for tracking the state of the scenario. In some embodiments, scenario state tracking 350 may use the scenario state to determine which scenarios to execute. Received signals may indicate that a scenario should be executed, in some embodiments. For example, a user interaction (direct—e.g., a button click to look for a device; indirect—e.g., the user launched an application) may be among the signals used to affect the applicability of a given scenario. These signals may be defined in the rules as enablement or disablement criteria for determining whether to execute a given scenario, for example. In cases where multiple scenarios may meet the execution criteria, static rules 305 may provide the guardrails to break the ties (e.g., via priority or calculated thresholds) or, in some embodiments, the system may indicate a need for user input to select a scenario. Scenario state tracking 350 may provide the state of the scenario to the rules engine 355 as an additional input for analysis of the filtered signals from signal filter 345. Scenario state tracking 350 may also provide data on the state of the scenario to the dynamic personal rules 325 for tuning the models. For example, scenarios may require multiple actions and steps to complete. Scenario state tracking 350 may include state information on the scenario including which steps are completed in a given scenario, which steps have been attempted and failed, and so forth. Scenario state tracking 350 may also transmit information about the scenario execution from the receiving device 300 to the transmitting device once the receiving device 300 receives the advertisement and executes an action in furtherance of the scenario. The transmitting device may use the feedback on scenario execution for additional tuning of the machine learning models in the transmitting device.

Scenario subscriber 360 may include hardware and/or software components capable of listening for an advertisement intended to advance the selected scenario. Scenario subscriber 360 may listen for the advertisement once rules engine 355 provides the indication that a transmitting device may be advertising.

Scenario execution 365 may receive the advertisement from scenario subscriber 360 and execute an action to advance the scenario. For example, if the scenario is to pair the receiving device 300 with the transmitting device, and the advertisement included a pairing request, scenario execution 365 may use the scenario state information from scenario state tracking to determine it should take the next action to pair the devices. Scenario execution 365 may also provide feedback to the source (e.g., cloud-hosted model training 120) of the dynamic general rules 310 to use in training and tuning the dynamic general rules 310 as well as providing feedback to the transmitting device for tracking the state of the scenario as well as training and tuning the transmitting device's machine learning models in the dynamic personal rules maintained on the transmitting device.

In use, receiving device 300 is operating and signals are being generated by signal sources 335. The signal receiver 340 may receive the signals and signal filter 345 may filter the signals and provide them to scenario state tracking 350. Scenario state tracking 350 may select a scenario for execution. The selected scenario may be provided with the scenario status to the rules engine 355 by the scenario state tracking 350. The rules database 320 may be updated periodically, as needed, by subscription, by request, or on any other schedule. The static rules 305 may be obtained and used by signal filter 345 as well as rules engine 355. The dynamic general rules 310 may also be updated periodically, as needed, by subscription, by request, or on any other schedule. The dynamic personal rules 325 may be generated, trained, and tuned periodically, as needed, by request, or on any other schedule. The merged rules 315 may be created for the scenario by, for example, the rules engine 355 or by a component in rules database 320. Rules engine 355, once it has the selected scenario, may access the relevant merged rules 315. The rules engine 355 may also receive the relevant signals from signal filter 345. In some embodiments, the signal filter 345 may also know which scenario is being executed and may provide only the relevant signals to rules engine 355. Rules engine 355 may use the merged rules 315 to analyze the filtered signals for the given scenario to determine whether a transmitting device is likely to be advertising to advance the scenario. Rules engine 355 may provide an indication that a transmitting device is likely advertising to scenario subscriber 360 in response to making such determination. Scenario subscriber 360 may listen for the advertisement in response to receiving the indication. Once received, scenario subscriber 360 may provide the advertisement to scenario execution 365. Scenario execution 365 may retrieve the state of the scenario from scenario state tracking 350 and execute an action in response to receiving the advertisement to advance the scenario. Once scenario execution 365 executes the action, it may provide feedback to the transmitting device, the source of the dynamic general rules, and scenario state tracking 350.

Figure 4:
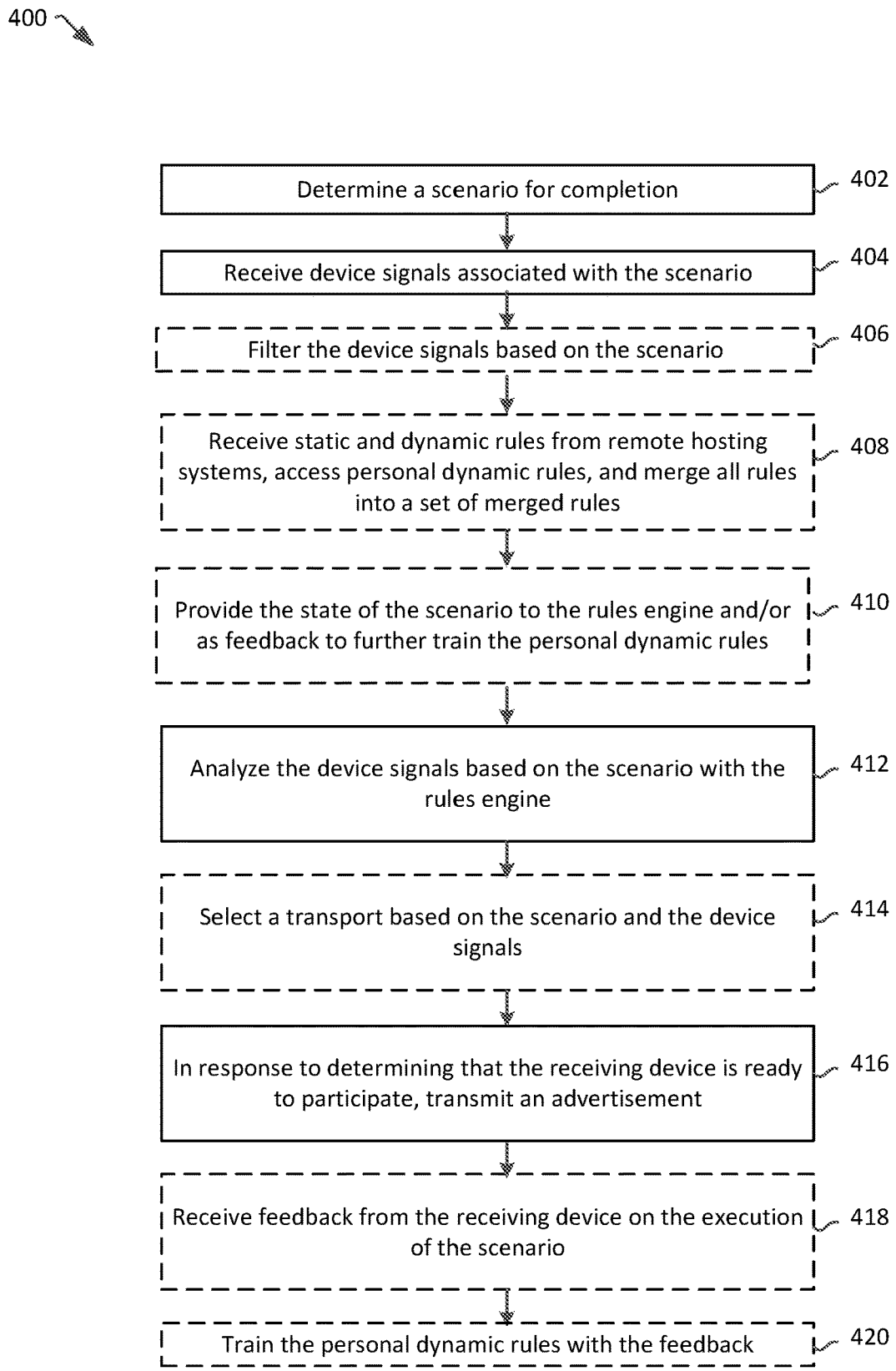
FIG. 4 is an exemplary method for intelligent advertisement with optimization.

FIG. 4 is an exemplary method 400 for intelligent advertising with optimization. The method 400 may be performed by a transmitting device such as transmitting device 105 as described with respect to FIG. 1 or transmitting device 200 as described with respect to FIG. 2. The method begins with determining (402) a scenario for completion. For example, scenario state tracking 250 may be used to determine the scenario of interest based on, for example, the state of the scenario and relevant signals being received indicating some advancement of the scenario may be possible.

At 404, the transmitting device may receive device signals associated with the scenario. For example, signal sources (e.g., signal sources 235) may continuously generate signals and a signal receiver (e.g., signal receiver 240) may receive the signals for processing.

At optional step 406, the signals may be filtered by a signal filter (e.g., signal filter 245) and relevant signals associated with the scenario may be provided to a rules engine (e.g., rules engine 255).

At optional step 408, static and dynamic rules from remote hosting systems may be received, personal dynamic rules may be accessed, and the relevant rules may be merged into a set of merged rules. For example, static rules 205, dynamic general rules 210, and dynamic personal rules 225 may be merged into merged rules 215 by, for example, rules engine 255 or a component in rules database 220 configured to merge associated rules into sets of rules that, for example, are scenario specific.

At optional step 410, the state of the scenario may be provided to the rules engine and/or as feedback to further train and tune the dynamic personal rules. For example, scenario state tracking 250 may provide the state of the scenario to rules engine 255 for analyzing the relevant signals associated with the scenario and/or to dynamic personal rules 225 for tuning the machine learning models used by rules engine 255 to analyze the signals.

At step 412, the rules engine may analyze the device signals based on the scenario. For example, rules engine 255 may analyze the relevant scenario signals received from signal receiver 240 or optional signal filter 245 in view of the state of the scenario received from scenario state tracking 250 based on the relevant merged rules 215 for the selected scenario.

At optional step 414, the rules engine may select a transport based on the scenario and the device signals. For example, based on analyzing the relevant signals with the merged rules 215, rules engine 255 may select a transport for the advertisement that is most likely to be successful. For example, a transport may be selected based on signal strength information for various transports that the rules engine received.

At step 416, in response to determining that the receiving device may be ready to participate in the scenario, the advertisement is transmitted. For example, rules engine 255 may determine a receiving device may be ready to participate in the scenario and provides an indication to scenario publisher 260. Scenario publisher 260, in response, transmits the relevant advertisement for a receiving device to hear and respond to.

At optional step 418, the transmitting device may receive feedback from the receiving device on the execution of the scenario. For example, scenario state tracking 250 may receive feedback from the receiving device on the state of the scenario and execution of the next action for the scenario including, for example, whether the next action was successful or failed and the state of the scenario from the perspective of the receiving device.

At optional step 420, the personal dynamic rules may be trained or tuned using feedback. For example, scenario state tracking 250 may provide feedback to dynamic personal rules 225 for tuning and training the machine learning models stored locally on transmitting device 200.

Figure 5:
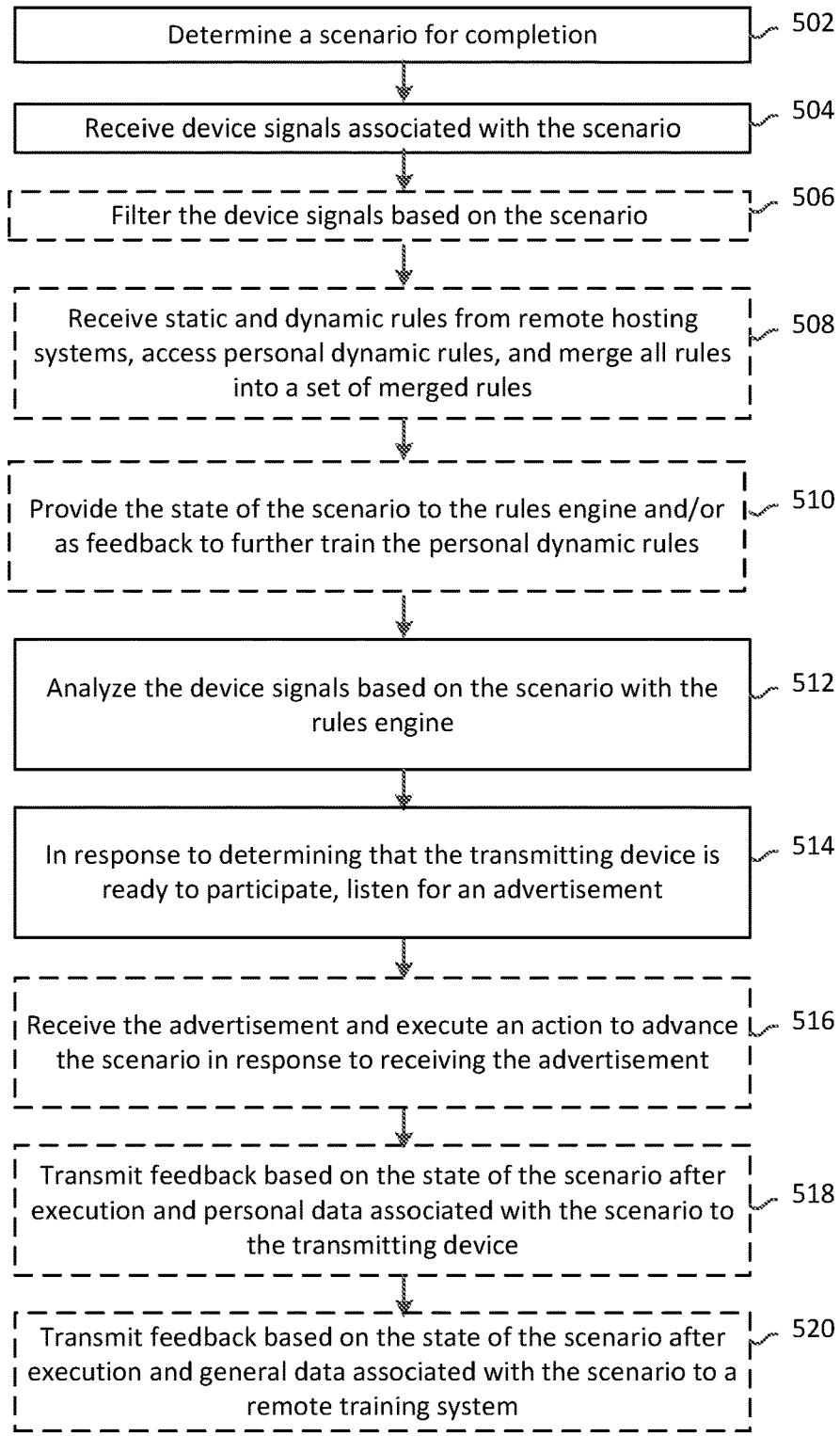
FIG. 5 is an exemplary method for intelligent listening with optimization.

FIG. 5 is an exemplary method 500 for intelligent listening with optimization. The method 500 may be performed by a receiving device such as receiving device 110 as described with respect to FIG. 1 or receiving device 300 as described with respect to FIG. 3. The method begins with determining (502) a scenario for completion. For example, scenario state tracking 350 may be used to determine the scenario of interest based on, for example, the state of the scenario and relevant signals being received indicating some advancement of the scenario may be possible.

At 504, the receiving device may receive device signals associated with the scenario. For example, signal sources (e.g., signal sources 335) may continuously generate signals and a signal receiver (e.g., signal receiver 340) may receive the signals for processing.

At optional step 506, the signals may be filtered by a signal filter (e.g., signal filter 345) and relevant signals associated with the scenario may be provided to a rules engine (e.g., rules engine 355).

At optional step 508, static and dynamic rules from remote hosting systems may be received, personal dynamic rules may be accessed, and the relevant rules may be merged into a set of merged rules. For example, static rules 305, dynamic general rules 310, and dynamic personal rules 325 may be merged into merged rules 315 by, for example, rules engine 355 or a component in rules database 320 configured to merge associated rules into sets of rules that, for example, are scenario specific.

At optional step 510, the state of the scenario may be provided to the rules engine and/or as feedback to further train and tune the dynamic personal rules. For example, scenario state tracking 350 may provide the state of the scenario to rules engine 355 for analyzing the relevant signals associated with the scenario and/or to dynamic personal rules 325 for tuning the machine learning models used by rules engine 355 to analyze the signals.

At step 512, the rules engine may analyze the device signals based on the scenario. For example, rules engine 355 may analyze the relevant scenario signals received from signal receiver 340 or optional signal filter 345 in view of the state of the scenario received from scenario state tracking 350 based on the relevant merged rules 315 for the selected scenario.

At step 514, in response to determining that a transmitting device may be ready to participate in the scenario, the receiving device may listen for an advertisement. For example, rules engine 355 may determine a transmitting device may be ready to participate in the scenario and provides an indication to scenario subscriber 360. Scenario subscriber 360, in response, may listen for an advertisement.

At optional step 516, the receiving device may receive the advertisement and execute an action to advance the scenario in response. For example, scenario subscriber 360 may receive the advertisement and provide it to scenario execution 365. Scenario execution 365 may execute an action to advance the scenario in response to receiving the advertisement.

At optional step 518, the receiving device may transmit feedback based on the state of the scenario after execution of the action and personal data associated with the scenario to the transmitting device. For example, scenario execution 365 may transmit feedback on the state of the scenario and execution of the next action for the scenario including, for example, whether the next action was successful or failed and the state of the scenario from the perspective of the receiving device 300 to the transmitting device. The feedback may be used by the transmitting device to further train and tune the dynamic personal machine learning models stored locally on the transmitting device.

At optional step 520, the receiving device may transmit feedback based on the state of the scenario after execution of the action and general data associated with the scenario to a remote training system. For example, scenario execution 365 may transmit feedback on the state of the scenario and execution of the next action for the scenario including, for example, whether the next action was successful or failed to cloud-hosted model training 120. The feedback may be used to further train and tune dynamic general machine learning models that are hosted by the service.

The feedback used to train the local models and hosted models from both the transmitting and receiving devices provide for continuous optimization of the systems to improve the accuracy of determining whether a receiving or transmitting device may be ready to participate in a scenario with the corresponding device making such determination. Advantageously, the solutions provided herein help limit unnecessary signal transmission, listening for such signals, and the associated battery consumption from engaging in unnecessary transmission and listening.

Figure 6:
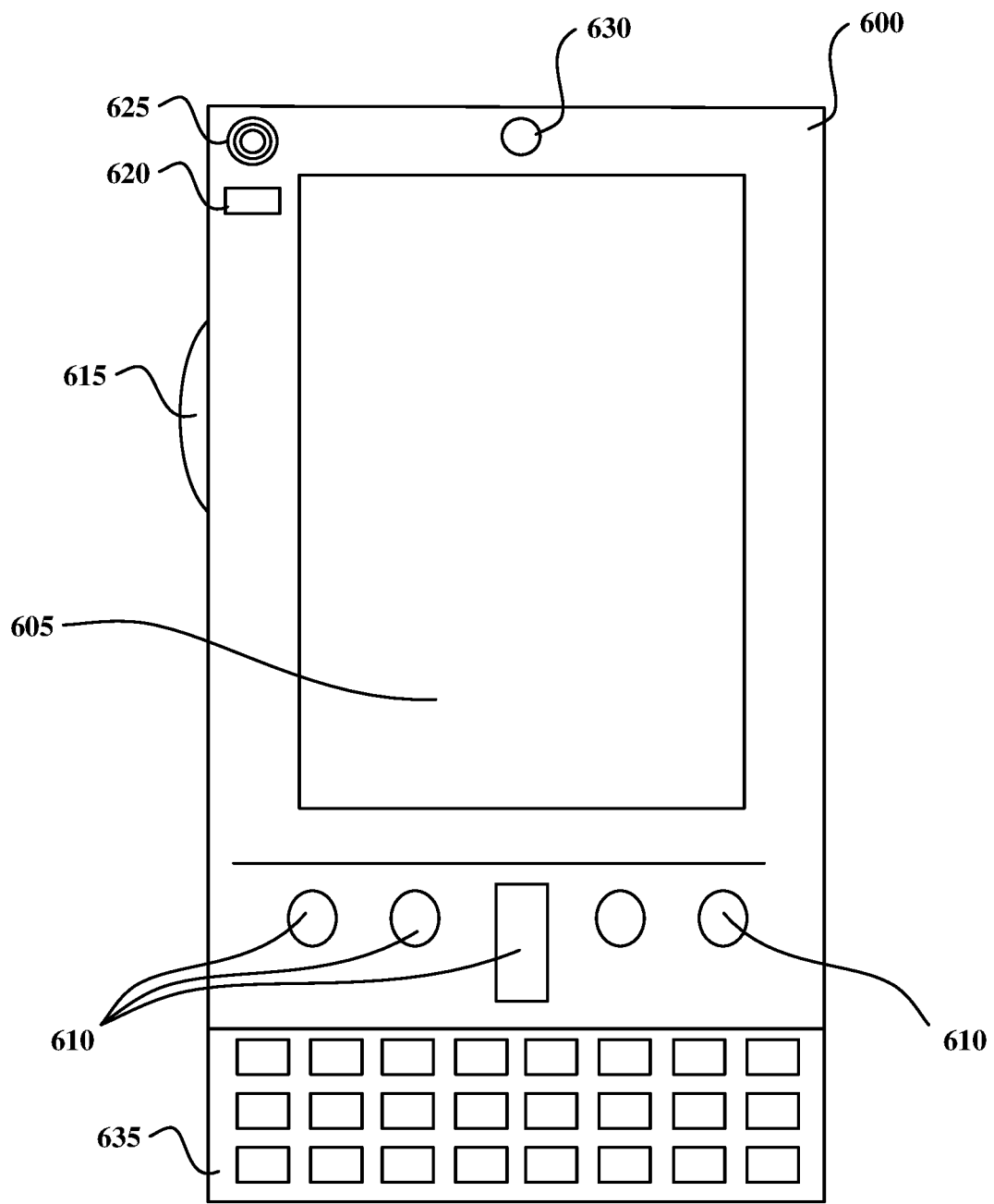
FIGS. 6 and 7 are simplified diagrams of a mobile computing device with which aspects of the disclosure may be practiced.
Figure 7:
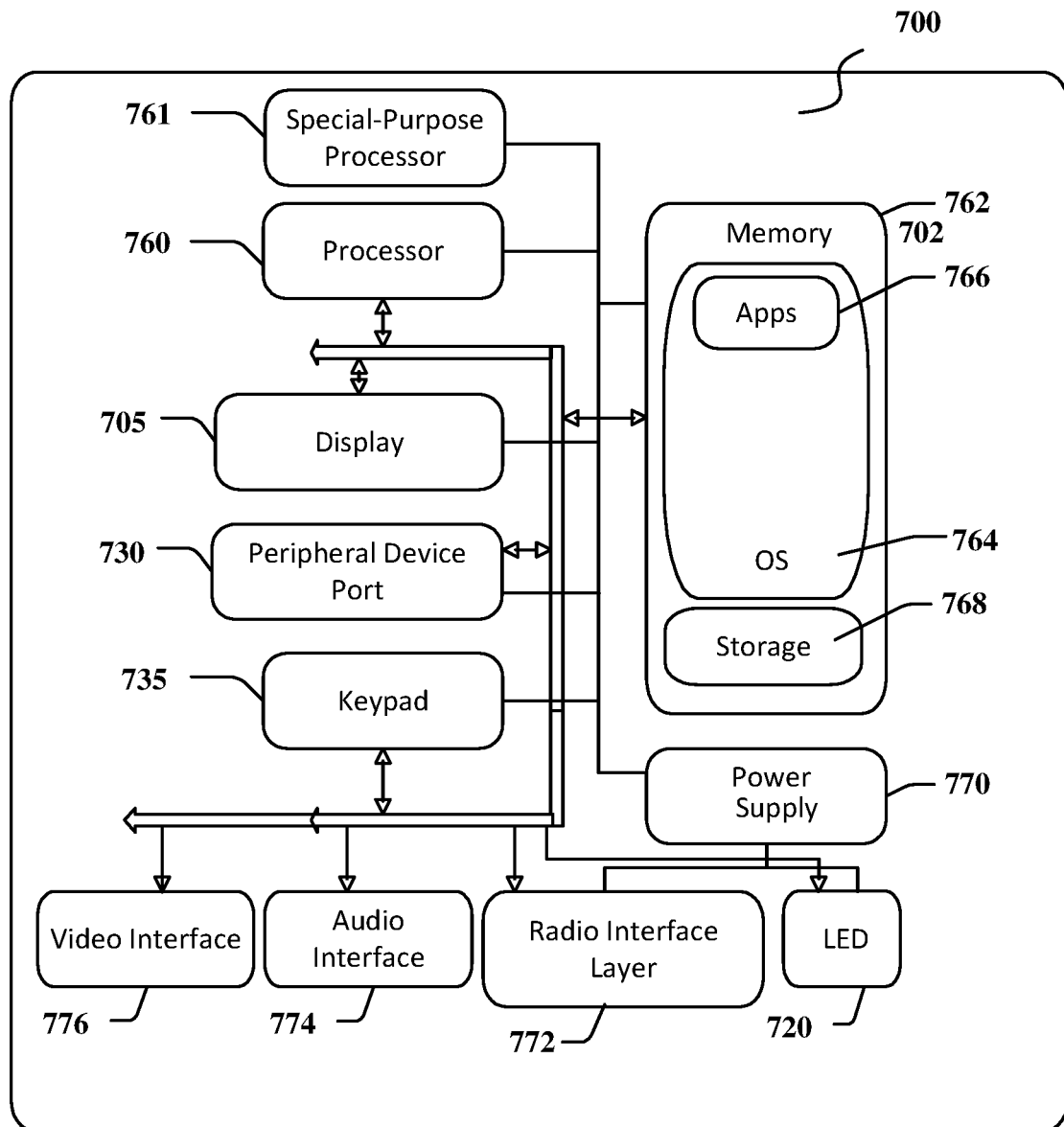

FIGS. 6 and 7 illustrate a mobile computing device 600, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device 700. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a focus state notification platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa. The radio communications may include near field communications transports such as Bluetooth®, near-field communication (NFC), Ultra-Wide Band (UWB), Wi-Fi®, Wi-Fi® Direct, and the like.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/ information transfer and storage means, including electronic mail and collaborative data/information sharing systems.

Figure 8:
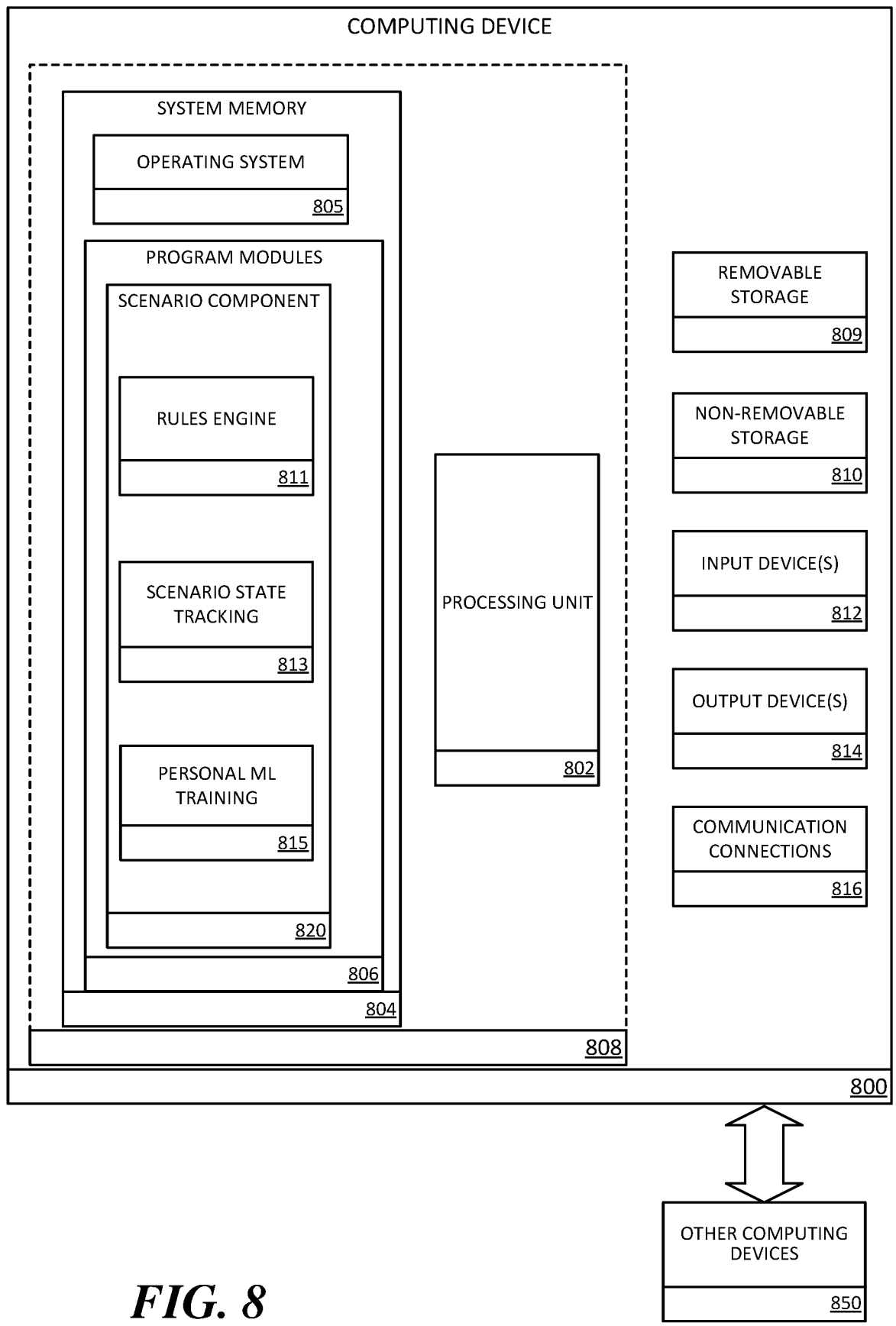
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for performing operations associated with an intelligent advertising and/or receiving system. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more application programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., scenario component 820) may perform processes including, but not limited to, the aspects, as described herein. According to examples, rules engine 811 may perform one or more operations associated with obtaining the rules and machine learning models used to analyze the signals for a given scenario. Scenario state tracking 813 may perform one or more operations associated with tracking the state of the scenario and transmitting the state to the rules engine 811 and/or the personal ML training 815. Personal machine learning model training 815 may perform one or more operations associated with training the machine learning models used in the scenarios by the rules engine 811. The scenario component 820 may include more or fewer modules for performing the functions described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal. Computer storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
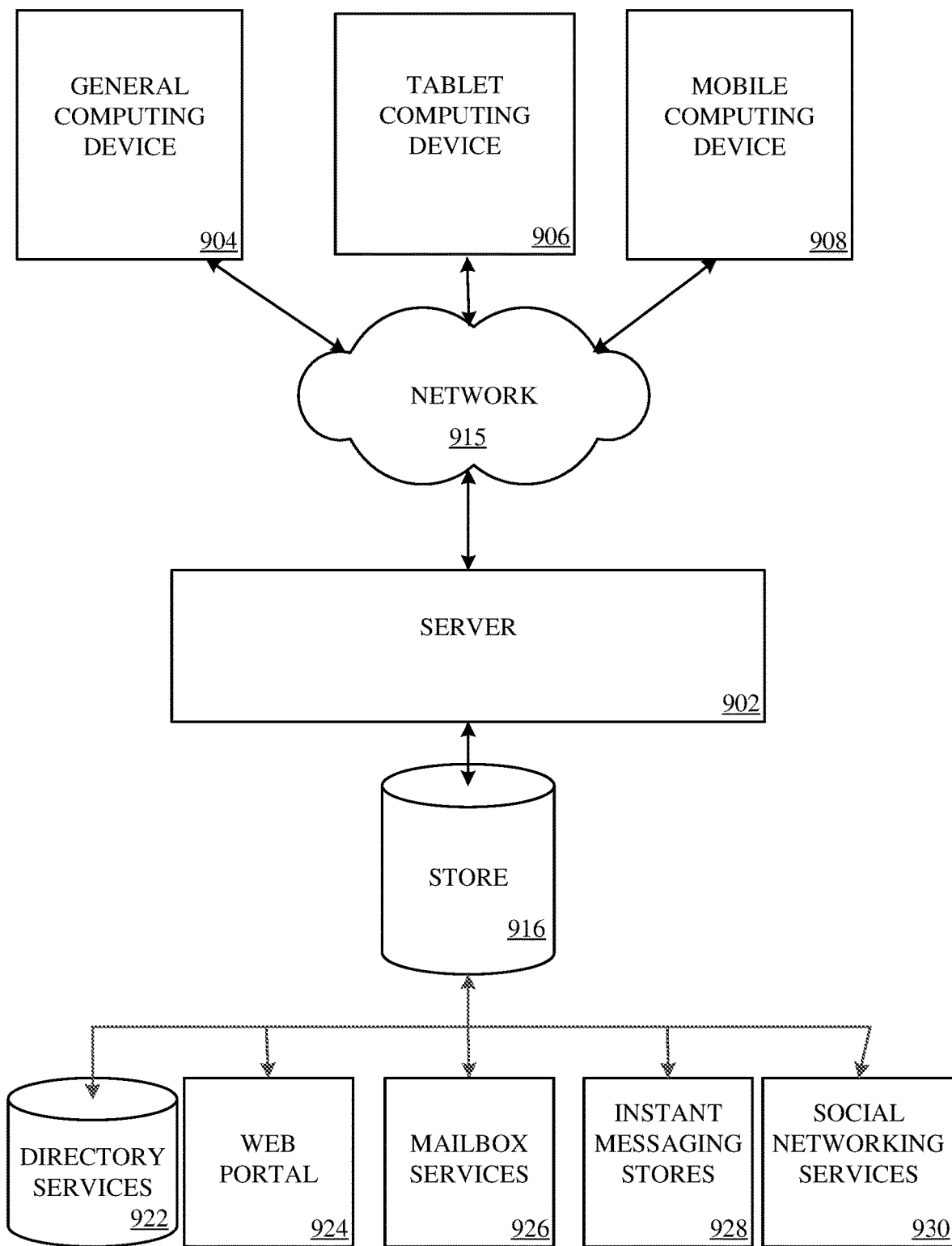
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer systems described herein may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for intelligent advertisement, the method comprising:
    determining, by a transmitting device, a scenario for completion between the transmitting device and a receiving device, wherein the scenario comprises an advertisement message transmitted from the transmitting device to the receiving device and an action performed by one of the transmitting device and the receiving device;
    receiving, at the transmitting device, device signals associated with the scenario;
    analyzing, with a rules engine of the transmitting device, the device signals based on the scenario to determine whether the receiving device is ready to participate in the scenario, wherein the rules engine comprises a combination of static rules and machine learning models; and
    in response to determining that the receiving device is ready to participate in the scenario, transmitting, by the transmitting device, the advertisement message to the receiving device to advance the scenario.

2. The computer-implemented method of claim 1, wherein the device signals comprise device state signals, connectivity signals, sensor signals, operating system signals, application signals, or a combination thereof.

3. The computer-implemented method of claim 1, further comprising:
    selecting a transport based on the scenario and the device signals, wherein the advertisement message is transmitted on the selected transport.

4. The computer-implemented method of claim 1, further comprising:
    receiving the static rules from a first remote hosting system;
    receiving general machine learning models from a second remote hosting system, wherein the general machine learning models comprise trained models trained using general data from a plurality of devices attempting to complete the scenario;
    accessing personal machine learning models, wherein the personal machine learning models comprise trained models trained using personal data specific to the transmitting device attempting to complete the scenario, and wherein the personal data is restricted based on privacy settings; and
    merging the static rules, the general machine learning models, and the personal machine learning models into a set of merged rules for the rules engine for analyzing the device signals based on the scenario.

5. The computer-implemented method of claim 1, further comprising:
    filtering the device signals based on the scenario, wherein the rules engine analyzes the filtered device signals.

6. The computer-implemented method of claim 1, further comprising:
    tracking a state of the scenario; and
    providing the state of the scenario to the rules engine, wherein the rules engine uses the state of the scenario in the analyzing the device signals.

7. The computer-implemented method of claim 1, further comprising:
    tracking a state of the scenario; and
    using the state of the scenario to train personal machine learning models for use in the rules engine.

8. The computer-implemented method of claim 7, further comprising:
    receiving feedback from the receiving device related to execution of the scenario; and
    using the feedback to train the personal machine learning models.

9. A transmitting device for intelligent advertisement, the transmitting device comprising:
    a memory for storing executable program code; and
    a processor, functionally coupled to the memory, the processor being responsive to computer-executable instructions contained in the program code and operative to:
        determine a scenario for completion between the transmitting device and a receiving device, wherein the scenario comprises an advertisement message transmitted from the transmitting device to the receiving device and an action performed by one of the transmitting device and the receiving device;
        receive device signals associated with the scenario;
        analyze, with a rules engine, the device signals based on the scenario to determine whether the receiving device is ready to participate in the scenario, wherein the rules engine comprises a combination of static rules and machine learning models; and in response to determining that the receiving device is ready to participate in the scenario, transmitting the advertisement message to the receiving device to advance the scenario.

10. The transmitting device of claim 9, wherein the device signals comprise device state signals, connectivity signals, sensor signals, operating system signals, application signals, or a combination thereof.

11. The transmitting device of claim 9, wherein the processor being responsive to further computer-executable instructions contained in the program code and operative to:
select a transport based on the scenario and the device signals; and
transmit the advertisement message on the selected transport.

12. The transmitting device of claim 9, wherein the processor being responsive to further computer-executable instructions contained in the program code and operative to:
receive the static rules from a first remote hosting system;
receive general machine learning models from a second remote hosting system, wherein the general machine learning models comprise trained models trained using general data from a plurality of devices attempting to complete the scenario;
access personal machine learning models, wherein the personal machine learning models comprise trained models trained using personal data specific to the transmitting device attempting to complete the scenario, and wherein the personal data is restricted based on privacy settings; and
merge the static rules, the general machine learning models, and the personal machine learning models into a set of merged rules for the rules engine for analyzing the device signals based on the scenario.

13. The transmitting device of claim 9, wherein the processor being responsive to further computer-executable instructions contained in the program code and operative to:
filter the device signals based on the scenario, wherein the rules engine analyzes the filtered device signals.

14. The transmitting device of claim 9, wherein the processor being responsive to further computer-executable instructions contained in the program code and operative to:
track a state of the scenario; and
provide the state of the scenario to the rules engine, wherein the rules engine uses the state of the scenario in the analyzing the device signals.

15. The transmitting device of claim 9, wherein the processor being responsive to further computer-executable instructions contained in the program code and operative to:
track a state of the scenario; and
use the state of the scenario to train personal machine learning models for use in the rules engine.

16. The transmitting device of claim 15, wherein the processor being responsive to further computer-executable instructions contained in the program code and operative to:
receive feedback from the receiving device on the execution of the scenario; and
use the feedback to train the personal machine learning models.

17. A computer-implemented method for intelligent listening, the method comprising:
determining, by a receiving device, a scenario for completion between a transmitting device and the receiving device, wherein the scenario comprises an advertisement message transmitted from the transmitting device to the receiving device and an action performed by one of the transmitting device and the receiving device;
receiving, at the receiving device, device signals associated with the scenario;
analyzing, with a rules engine of the receiving device, the device signals based on the scenario to determine whether the transmitting device is ready to participate in the scenario, wherein the rules engine comprises a combination of static rules and machine learning models; and
in response to determining that the transmitting device is ready to participate in the scenario, listening for the advertisement message from the transmitting device to advance the scenario.

18. The computer-implemented method of claim 17, further comprising:
receiving the advertisement message; and
executing the action to advance the scenario in response to receiving the advertisement message.

19. The computer-implemented method of claim 18, further comprising:
tracking a state of the scenario; and
transmitting feedback based on the state of the scenario and personal data associated with the scenario to the transmitting device.

20. The computer-implemented method of claim 18, further comprising:
tracking a state of the scenario; and
transmitting feedback based on the state of the scenario and general data associated with the scenario to a remote training system.

* * * * *